(12) United States Patent
Proidl

(10) Patent No.: US 6,961,510 B1
(45) Date of Patent: Nov. 1, 2005

(54) REPRODUCING DEVICE WITH AUTOMATIC CHANGE-OVER BETWEEN TRICK-PLAY SPEEDS

(75) Inventor: Aolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 871 days.

(21) Appl. No.: 09/635,113

(22) Filed: Aug. 9, 2000

(30) Foreign Application Priority Data

Aug. 11, 1999 (EP) .................................. 99890266

(51) Int. Cl.$^7$ ............................................. H04N 5/91
(52) U.S. Cl. ........................... 386/68; 360/35; 360/44; 360/47; 360/53; 360/73.06
(58) Field of Search ................. 386/68, 46; 360/73.06, 360/53, 35, 47.44

(56) References Cited

U.S. PATENT DOCUMENTS

| | | | | |
|---|---|---|---|---|
| 4,294,354 | A | | 10/1981 | Ariga ........................ 206/335 |
| 4,791,512 | A | * | 12/1988 | Takahashi et al. ............ 386/69 |
| 5,047,872 | A | * | 9/1991 | Heitmann ..................... 386/72 |
| 5,615,018 | A | * | 3/1997 | Wu et al. ..................... 386/68 |
| 6,031,679 | A | * | 2/2000 | Higurashi ................. 360/73.06 |
| 6,122,433 | A | * | 9/2000 | McLaren ..................... 386/68 |
| 6,191,900 | B1 | * | 2/2001 | Higurashi et al. ............ 360/18 |
| 6,222,981 | B1 | * | 4/2001 | Rijckaert ..................... 386/68 |

FOREIGN PATENT DOCUMENTS

EP 0762757 A2 3/1997

* cited by examiner

Primary Examiner—James J. Groody
Assistant Examiner—Alicia M Duggins

(57) ABSTRACT

In a reproducing device (1) for the reproduction of reproduction data (WD) recorded on a magnetic tape (2), having transport means (7) for the transport of the magnetic tape (2) with a normal-play speed ($V_{NS}$, $V_{NLS2}$, $V_{NLS3}$, $V_{NLS5}$, $V_{NLS7}$, $V_{NHS}$), a first trick-play speed ($V_{T1}$) and at least a second trick-play speed ($V_{T2}$, $V_{T3}$), the normal-play speed ($V_{NS}$, $V_{NLS2}$, $V_{NLS3}$, $V_{NLS5}$, $V_{NLS7}$, $V_{NHS}$) corresponding to a recording speed during the recording of the reproduction data (WD) on the magnetic tape (2), and having reproducing means (13) for the reproduction of normal-play reproduction data (NP1, NP2, NP3, NP4, NP5) recorded on the magnetic tape (2) during transport of the magnetic tape (2) with the normal-play speed ($V_N$), of first trick-play reproduction data (TPD1, TPD6) recorded during transport of the magnetic tape (2) with the first trick-play speed ($V_{T1}$), and of second trick-play reproduction data (TPD2, TPD3, TPD4, TPD5, TPD7) recorded during transport of the magnetic tape (2) with the second trick-play speed ($V_{T2}$, $V_{T3}$), test means (23) have been provided for testing whether during transport of the magnetic tape (2) with the first trick-play speed ($V_{T1}$) valid first trick-play reproduction data (TPD1, TPD6) is reproduced, and the test means (23) are adapted to supply control information (SI) to the transport means (7) in the absence of reproduced valid first trick-play reproduction data (TPD1, TPD6) during a test interval (T), in order to cause a transport of the magnetic tape (2) with the second trick-play speed ($V_{T2}$, $V_{T3}$).

8 Claims, 2 Drawing Sheets

REPRODUCING DEVICE WITH AUTOMATIC CHANGE-OVER BETWEEN TRICK-PLAY SPEEDS

BACKGROUND OF THE INVENTION

The invention relates to a reproducing device as defined in the opening part of claim 1 and to a method of reproducing reproduction data as defined in the opening part of claim 6.

Such a reproducing device as defined in the opening part of claim 1 is known from the document EP 0 896 718 A2 and takes the form of a digital video recorder which is adapted to reproduce reproduction data, recorded on a magnetic tape, in accordance with a method as defined in the opening part of claim 6.

The known video recorder has transport means by which the magnetic tape can be moved in the longitudinal direction of the magnetic tape with a normal-play speed and a plurality of trick-play speeds. The normal-play speed during the reproduction of reproduction data then corresponds to a recording speed during the recording of the reproduction data on the magnetic tape. A first trick-play speed corresponds to, for example, 4 times the normal-play speed and a second trick-play speed to, for example, 6 times the normal-play speed.

The known video recorder further has reproducing means for reproducing reproduction data recorded on the magnetic tape, which reproducing means include a scanner having a rotationally drivable head disc carrying magnetic heads. When the magnetic tape is moved with the normal-play speed the magnetic heads scan reproduction areas of the magnetic tape from which the reproducing means can reproduce the normal-play reproduction data. Likewise, when the magnetic tape is moved with the first trick-play speed, the reproducing means can reproduce first trick-play reproduction data and, when the magnetic tape is moved with the second trick-play speed, they can reproduce second trick-play reproduction data, if such trick-play reproduction data has been recorded on the magnetic tape.

The known video recorder is adapted to reproduce reproduction data recorded on the magnetic tape in accordance with the DVHS standard (D-VHS System Standard, January, MPEG2 STD/HS/LS, Trick Play Format). The DVHS standard specifies that, in addition to normal-play reproduction data recorded in normal-play reproduction areas, trick-play data may be but need not be recorded in trick-play reproduction areas.

It has proved to be a drawback of the known video recorder that a user, after a magnetic-tape cassette has been inserted into the video recorder, does not have any information about the trick-play speeds at which trick-play reproduction data can be reproduced from the magnetic-tape cassette, for example as picture information. Thus, it may happen that the user of the video recorder selects the first trick-play speed for the reproduction of trick-play reproduction data and that a television set connected to the video recorder does not display any picture information although the trick-play reproduction data can be reproduced at a second trick-play speed and can be displayed as picture information.

In this respect, it has proved to be particularly disadvantageous when, for example, in addition to a first film recorded on the magnetic tape as normal-play reproduction data, first trick-play reproduction data reproducible at the first trick-play speed has been recorded and, in addition to a second film recorded as normal-play data on the magnetic tape after the first film, second trick-play reproduction data reproducible at the second trick-play speed has been recorded. When in this case the user activates the reproduction of trick-play reproduction data with the first trick-play speed, in order to obtain an overview of the films recorded on the magnetic-tape cassette, he will first see the picture information corresponding to the first film and will suddenly see no longer any picture information, although the second trick-play reproduction data can be reproduced at the second trick-play speed and can be displayed as picture information.

SUMMARY OF THE INVENTION

It is an object of the invention to provide a reproducing device for and a method of reproducing reproduction data which precludes the afore-mentioned drawbacks. With a reproducing device this object is achieved by means of the steps defined in the characterizing part of claim 1 and with a method of reproducing reproduction data it is achieved by means of the steps defined in the characterizing part of claim 6.

As a result of this, it is achieved that an automatic change-over to the second trick-play speed is effected if no valid first trick-play reproduction data is reproduced during a test interval of, for example, 0.6 s in which the magnetic tape is moved with the first trick-play speed. If during a further test interval no valid second trick-play reproduction data can be reproduced with the second trick-play speed, because no trick-play reproduction data have been recorded on the magnetic tape, it is for example possible to change over automatically to a third trick-play speed.

This has the advantage of an automatic change-over to a trick-play speed at which the valid trick-play reproduction data are reproduced from the magnetic tape, which data can be displayed as picture information.

The steps defined in claim 2 have the advantage that the reproducing device is capable of reproducing reproduction data recorded on a magnetic tape in accordance with the widespread DVHS standard.

The DVHS standard further specifies that, if trick-play reproduction data is recorded on the magnetic tape by a recording device, at any rate trick-play reproduction data should be recorded which can be reproduced at a trick-play speed corresponding to 12 times the normal-play speed (standard mode). However, the DVHS standard does not specify whether and what further trick-play reproduction data should be recorded on the magnetic tape.

The steps defined in claim 3 yield the advantage that if no first trick-play reproduction data can be reproduced during the test interval while the magnetic tape is moved at the first trick-play speed, an automatic change-over to the second trick-play speed, which corresponds to the 12-fold normal-play speed of the standard mode, is effected, at which speed it is assured that valid second trick-play reproduction data can be reproduced if actually any trick-play reproduction data has been recorded on the magnetic tape.

The steps defined in claim 4 have the advantage that an automatic change-over of the trick-play speed in accordance with claim 2 to the 12-fold normal-play speed of the standard mode can be effected in the case of reproduction data recorded in the standard mode, one of the low-speed modes or in the high-speed mode.

The DVHS standard further specifies that trick-play packs may be though need not be recorded in a subcode reproduction area. A trick-play speed code, which specifies trick-play speeds, can be recorded in a trick-play pack. When a magnetic tape is moved at one of the trick-play speeds thus specified it is ensured that valid trick-play reproduction data can be reproduced from the magnetic tape.

The steps defined in claim 5 and in claim 7 yield the advantage that the trick-play speed code, which may be recorded in a trick-play pack, is detected and evaluated so as to supply control information to the transport means in the absence of valid reproduced first trick-play reproduction data, in order to achieve an automatic change-over to a second trick-play speed at which it is ensured that second trick-play reproduction data can be reproduced.

The steps defined in claim 8 yield the advantage that even when no trick-play reproduction data has been recorded on the magnetic tape picture information can be displayed which, in addition, may include index data contained in reproduction data reproduced from subcode reproduction areas. The index data include for example information about the current magnetic tape position and whether any reproduction data at all has been recorded on the magnetic tape.

BRIEF DESCRIPTION OF THE DRAWING

The invention will be described hereinafter with reference to an embodiment shown in the drawings by way of example, to which embodiment the invention is not limited.

DESCRIPTION OF THE PREFERRED EMBODIMENTS

Figure 1:
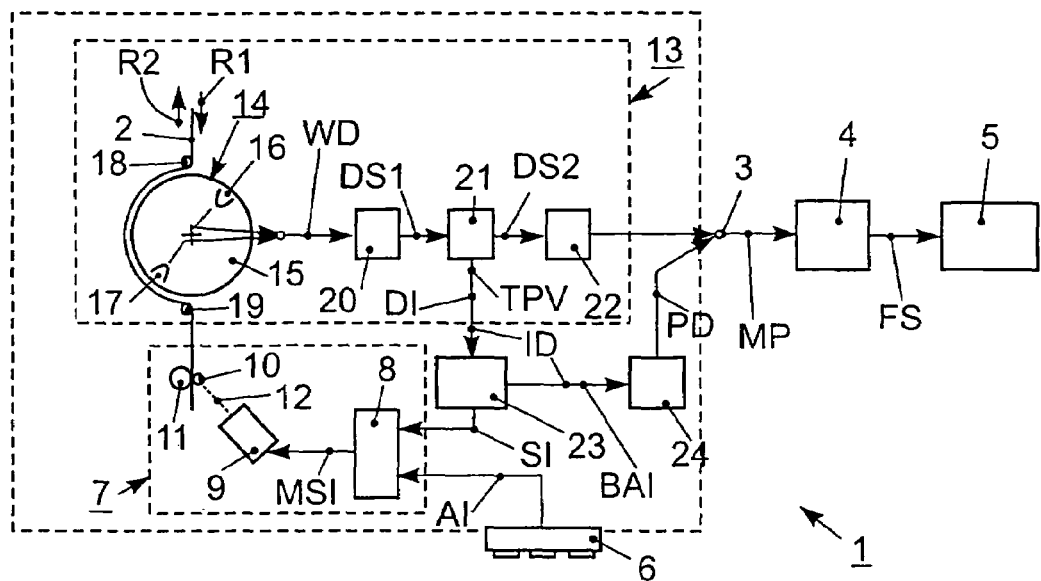
FIG. 1 is a block diagram which shows a video recorder having test means for checking whether valid trick-play reproduction data is reproduced during a test interval.

FIG. 1 shows a video recorder 1 adapted to reproduce reproduction data WD recorded on a magnetic tape 2 of a magnetic-tape cassette. The reproduction data WD reproduced by the video recorder 1 are available on an output terminal 3 of the video recorder 1 as an MPEG transport stream MP after processing by the video recorder 1. An MPEG transport stream MP complies with the MPEG standard (MPEG Standard (System): ISO/IEC 13.818/1) and is formed by transport stream packets, the MPEG standard defining video packets containing encoded video data, audio packets containing encoded audio data, data packets containing additional data and table packets containing table information.

FIG. 1 further shows a set top box 4 which can be connected to the output terminal 3 of the video recorder 1 and to which a reproduced MPEG transport stream MP can be applied. The set top box 4 can process an MPEG transport stream MP applied to it and the set top box 4 can supply an analog television signal FS to a television set 5. The television set 5 can display picture information and can reproduce sound information contained in the analog television signal FS.

The video recorder 1 has a keypad 6 by means of which a user of the video recorder 1 can activate modes of operation of the video recorder 1. It is thus possible to activate, for example, a normal-play reproducing mode for reproducing normal-play reproduction data NPD contained in reproduced reproduction data WD or a trick-play reproducing mode for reproducing trick-play reproduction data TPD contained in reproduced reproduction data WD. The keypad 6 can supply corresponding activation information AI to transport means 7 of the video recorder 1.

The transport means 7 are adapted to move the magnetic tape 2 with a normal-play speed $V_N$, a first trick-play speed $V_{T1}$, a second trick-play speed $V_{T2}$, and a third trick-play speed $V_{T3}$, the normal-play speed $V_N$ corresponding to a recording speed during the recording of the reproduction data WD on the magnetic tape 2.

It is to be noted that during the recording of reproduction data WD in a recording device the magnetic tape 2 can be moved with a recording speed which corresponds to the normal-play speed $V_{NS}$ of 16.67 +/−0.5% mm/s (STD mode), the normal-play speed $V_{NLS2}$ of 8.33 +/−0.5% mm/s (LS2 mode), the normal-play speed $V_{NLS3}$ of 5.55 +/−0.5% mm/s (LS3 mode), the normal-play speed $V_{NLS5}$ of 3.33 +/−0.5% mm/s (LS5 mode), the normal-play speed $V_{NLS7}$ of 2.38 +/−0.5% mm/s (LS7 mode), or the normal-play speed $V_{NHS}$ of 33.35 +/−0.5% mm/s (HS mode), as defined in the DVHS standard. However, in the present document the normal-play speed VN is to be understood to mean the reproducing speed of the magnetic tape 2 which corresponds to the respective recording speed.

Regardless of the recording speed, the first trick-play speed $V_{T1}$ corresponds to 4 times the normal-play speed $V_{NS}$, the second trick-play speed $V_{T2}$ corresponds to 6 times the normal-play speed $V_{NS}$, and the third trick-play speed $V_{T3}$ corresponds to 12 times the normal-play speed $V_{NS}$ of the standard mode.

The transport means 7 include control means 8, a motor 9, a capstan 10 and a pressure roller 11. The keypad 6 can supply activation information AI, which activates the normal-play reproducing mode or the trick-play reproducing mode, to the control means 8. The control means 8 are thus adapted to supply motor control information MSI to the motor 9, which information corresponds to a motor speed to be reached in order to move the magnetic tape 2 with one of the normal-play speeds $V_N$ or one of the trick-play speeds $V_{T1}$, $V_{T2}$ or $V_{T3}$.

Via a transmission 12 the motor 9 is adapted to drive the capstan 10. The capstan 10 presses the magnetic tape 2 against the pressure roller 11, as a result of which the magnetic tape 2 can be moved in a forward transport direction R1 or a reverse transport direction R2. When the video recorder 1 can be set to reproducing modes the magnetic tape 2 is moved in the forward transport direction R1, which corresponds to the transport direction during the recording of the reproduction data WD onto the magnetic tape 2. However, the measures in accordance with the invention are likewise applicable to trick-play speeds $V_T$ at which the magnetic tape 2 is moved in the reverse transport direction R2.

The video recorder 1 further has reproducing means 13 for reproducing from the magnetic tape 2 normal-play reproduction data NPD when the magnetic tape 2 is moved at the normal-play speed $V_N$, and trick-play reproduction data TPD when the magnetic tape 2 is moved at the first trick-play speed $V_{T1}$, the second trick-play speed $V_{T2}$ or the third trick-play speed $V_{T3}$. For this purpose, the reproducing means 13 include scanner means 14 which comprise a rotationally drivable head disc 15 which carries magnetic heads 16 and 17. The magnetic tape 2 can be led past the scanner means 14 with the aid of tape guide rollers 18 and 19 in a customary manner.

The magnetic heads 16 and 17 scan normal-play reproduction areas of helical recording tracks of the magnetic tape 2, in which the normal-play reproduction data NPD have been recorded, while the magnetic tape 2 is moved with the normal-play speed $V_N$. The magnetic heads 16 and 17 scan trick-play reproduction areas of helical recording tracks of the magnetic tape 2, in which the trick-play reproduction data TPD have been recorded, while the magnetic tape 2 is moved with one of the trick-play speeds $V_{T1}$, $V_{T2}$ or $V_{T3}$. The reproducing means 13 are adapted to reproduce reproduction data WD in accordance with the DVHS standard (D-VHS System Standard, January 1999, MPEG2 STD/HS/ LS Trick Play Format), as is known for example from the document EP 0 896 718 A2, incorporated herein by reference.

For the processing of the reproduced reproduction data WD the reproducing means 13 include an error correction stage 20, a read-out stage 21 and a time code evaluation stage 22. When the video recorder 1 is in the reproducing mode the magnetic heads 16 and 17 of the scanner means 14 can supply reproduction data WD to the error correction stage 20. The error correction stage 20 is adapted to evaluate redundancy information contained in the reproduced reproduction data WD. The error correction stage 20 is adapted to determine errors produced during the recording or reproduction of the reproduction data WD and to correct these errors. The redundancy stage 20 is adapted to subsequently supply a first data stream DS1 to the read-out stage 21.

The read-out stage 21 is adapted to read matching information from the first data stream DS1 recorded on the magnetic tape 2 in blocks different reproduction areas in accordance with the DVHS standard. The read-out stage 21 is also adapted to read additional information recorded in subcode reproduction areas, such as for example a trick-play speed code TPV contained in trick-play packs. Additional information can be reproduced from the subcode reproduction areas by the reproducing means 13 both when the magnetic tape 2 is moved at the normal-play speed $V_N$ and at one of the trick-play speeds $V_T$.

The DVHS standard specifies that, in addition to a film recorded on the magnetic tape 2 as normal-play reproduction data NPD in normal-play reproduction areas, trick-play data TPD may be but need not be recorded in trick-play reproduction areas. When for a trick-play reproducing mode of the film trick-play reproduction data TPD which are reproducible at given trick-play speeds $V_T$ are recorded on the magnetic tape 2 it is possible to record, in addition, trick-play packs containing a trick-play speed code TPV characteristic of these trick-play speeds $V_T$ in subcode reproduction areas. When in the trick-play reproducing mode of the video recorder 1 the magnetic tape 2 is move at one of the trick-play speeds $V_T$ defined in the trick-play speed code TPV, it is certain that the reproduced reproduction data WD include trick-play reproduction data TPD.

The evaluation stage 28 is further adapted to ascertain whether the first data stream DS1 includes valid reproduction data WD, as will be described in greater detail hereinafter. The read-out stage 21 is then adapted to supply a second data stream DS2 containing transport stream packets and associated time code information to the time code evaluation stage 22.

The time code evaluation stage 22 is adapted to evaluate time code information associated with each transport stream packet contained in the second data stream DS2 and to supply the associated transport stream packet to the output terminal 3 of the video recorder 1 at the correct time. Thus, it is achieved that the time sequence of transport stream packets of an MPEG transport stream MP recorded on the magnetic tape 2 as reproduction data WD by a recording device is restored during the reproduction of said reproduction data WD by the video recorder 1.

The video recorder 1 now includes test means 23 for examining whether valid trick-play reproduction data TPD is reproduced during a test interval T in which the magnetic tape 2 is moved at one of the trick-play speeds $V_{T1}$, $V_{T2}$ or $V_{T3}$. The test means 23 are further adapted to supply control information SI to the transport means 7 in the absence of valid trick-play reproduction data TPD during a test interval T, in order to cause the magnetic tape 2 to be moved at another one of the trick-play speeds $V_{T1}$, $V_{T2}$ and $V_{T3}$. For this purpose the read-out stage 21 can supply detection information DI to the test means 23, which information characterizes the fact that the read-out stage 21 has detected the presence of valid trick-play reproduction data TPD during the read-out of matching information. When in the trick-play reproducing mode of the video recorder 1 the test means 23 receives no detection information DI during the test interval T the test means 23 supply control information SI to the control means 8 in order to cause a transport of the magnetic tape 2 at another trick-play speed $V_{T1}$, $V_{T2}$ or $V_{T3}$, as will be described hereinafter with reference to another example of use.

The test means 23 are further adapted to check the trick-play speed code TPV read from the trick-play pack of the first data stream DS1 by the read-out means 21 and transferred to the test means 23. The test means 23 are adapted to supply thereupon control information SI to the control means 8 in the absence of reproduced valid trick-play reproduction data TPD, in order to effect a transport of the magnetic tape 2 with a trick-play speed $V_{T1}$, $V_{T2}$ or $V_{T3}$ characterized by the trick-play speed code TPV. This will be described in more detail hereinafter with reference to the example of use of the video recorder 1.

The video recorder 1 now further includes an OSD memory stage 24 which stores OSD image data PD. When the test means 23 detect that reproduction data WD reproduced when the magnetic tape 2 is moved at the first, the second and the third trick-play speed $V_T$ do not contain any valid trick-play reproduction data TPD, the test means 23 can supply image data activation information BAI to the OSD memory stage 24, in order to cause stored OSD image data PD to be supplied to the output terminal 3.

Such OSD image data PD may include textual information stating that unfortunately no trick-play reproducing mode is possible for the film recorded on the magnetic tape because no trick-play reproduction data TPD has been recorded on the magnetic tape 2. Such OSD image data PD can also be inserted into the index data ID read out of the subcode reproduction areas by the read-out stage 21. Such index data ID may indicate, for example, the current magnetic tape position P or additional information relating to a film recorded in the normal-play reproduction areas. This will be elucidated with reference to the example of use.

Figure 2:
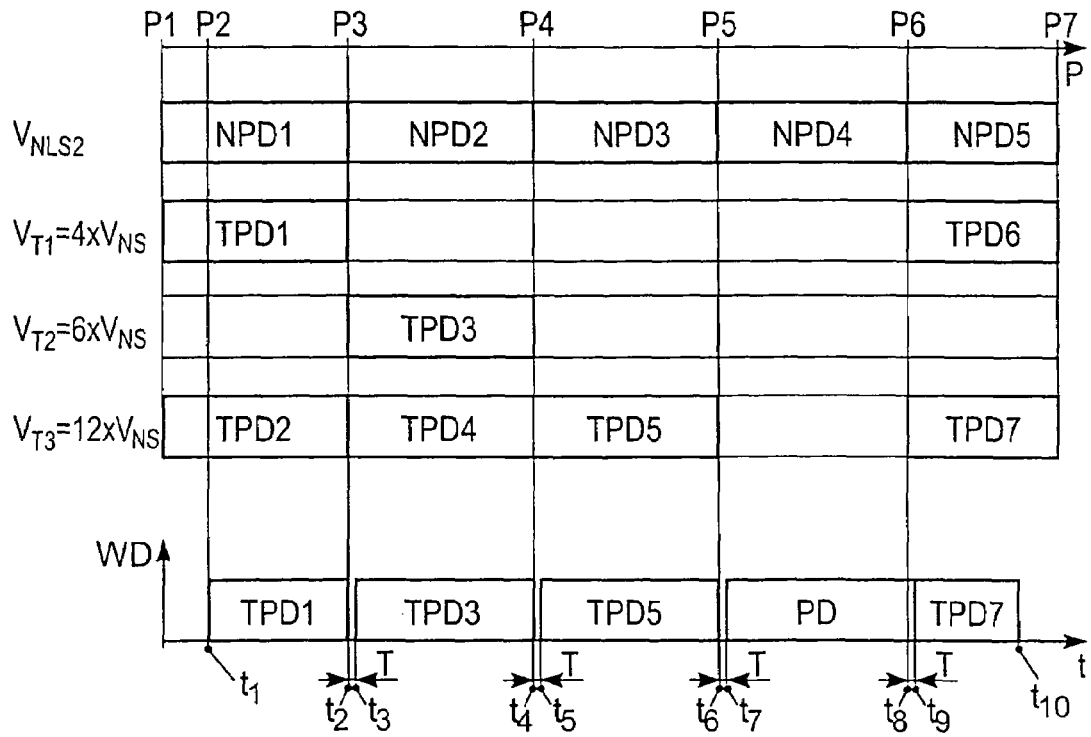
FIG. 2 symbolically shows normal-play reproduction data NPD recorded on a magnetic tape in normal-play areas and trick-play reproduction data TPD recorded on the magnetic tape in trick-play areas, which are reproduced by the video recorder of FIG. 1 from an instant $t_1$ till an instant $t_{10}$.

An example of use of the video recorder 1 will now be described with reference to FIG. 2. FIG. 2 symbolically shows normal-play reproduction data NPD recorded in normal-play reproduction areas on the magnetic tape 2 with a recording speed corresponding to the normal-play speed $V_{NLS2}$ and trick-play reproduction data TPD recorded in trick-play reproduction areas on the magnetic tape 2, only trick-play reproduction data TPD reproducible during transport of the magnetic tape 2 in the forward transport direction R1 being represented symbolically. A magnetic tape position P1 corresponds to the leading end of the magnetic tape 2 and a magnetic tape position P7 to the trailing end of the magnetic tape 2. On the magnetic tape 2 five films have been recorded, for example a first film being recorded in normal-play reproduction areas of the magnetic tape 2 from the magnetic tape position P1 to the magnetic tape position P3 as normal-play reproduction data NPD1. In addition, first trick-play reproduction data TPD1 reproducible at the first trick-play speed $V_{T1}$ and second trick-play reproduction data TPD2 reproducible at the third trick-play speed $V_{T3}$ have been recorded in trick-play reproduction areas for the first film.

For the second film recorded as second normal-play reproduction data NPD2 in normal-play reproduction areas third trick-play reproduction data TPD3 reproducible at the second trick-play speed $V_{T2}$ and fourth trick-play reproduction data TPD4 reproducible at the third trick-play speed $V_{T3}$ have been recorded additionally in trick-play reproduction areas of the magnetic tape 2. For the third film recorded as third normal-play reproduction data NPD3 in normal-play reproduction areas fifth trick-play reproduction data TPD5 reproducible at the third trick-play speed $V_{T3}$ have been recorded additionally in trick-play reproduction areas of the magnetic tape 2. For the fourth film recorded as fourth normal-play reproduction data NPD4 in normal-play reproduction areas no trick-play reproduction data TPD has been recorded. Finally, for the fifth film recorded as fifth normal-play reproduction data NPD5 in normal-play reproduction areas sixth trick-play reproduction data TPD6 reproducible at the first trick-play speed $V_{T1}$ and seventh trick-play reproduction data TPD7 reproducible at the third trick-play speed $V_{T3}$ have been recorded additionally in trick-play reproduction areas of the magnetic tape 2.

The DVHS standard specifies that in the case that trick-play reproduction data TPD is recorded on a magnetic tape by a recording device at any rate trick-play reproduction data TPD reproducible at a trick-play speed $V_{T3}$ corresponding to 12 times the normal-play speed $V_{NS}$ should be recorded. However, the DVHS standard does not specify whether and what further trick-play reproduction data TPD should be recorded. The example of use shown in FIG. 2 complies with these specifications.

In the example of use it is now assumed that the user loads the magnetic-tape cassette containing the magnetic tape 2 into the video recorder 1 and actuates a trick-play reproducing mode in order to obtain an overview of the films recorded on the magnetic tape 2. For this purpose, the user actuates a key of the keypad 6 at an instant $t_1$ in order to reproduce first trick-play reproduction data TPD1 reproducible with the first trick-play speed $V_{T1}$ starting from the current magnetic tape position P2. Subsequently, reproduction data WD including first trick-play reproduction data TPD1 is reproduced by the magnetic heads 16 and 17 from the instant $t_1$ till the instant $t_2$, as is shown symbolically in FIG. 2.

Reproduced reproduction data WD is processed by the error correction stage 20, the read-out stage 21 and the time code evaluation stage 22 and is supplied to the set top box 4 as an MPEG transport stream MP. An analog television signal FS which is subsequently supplied by the set top box 4 contains picture information and, if applicable, also sound information of the first film, which information is reproduced by means of the television set 5. The user then sees the film at an increased reproducing speed.

Figure 3:
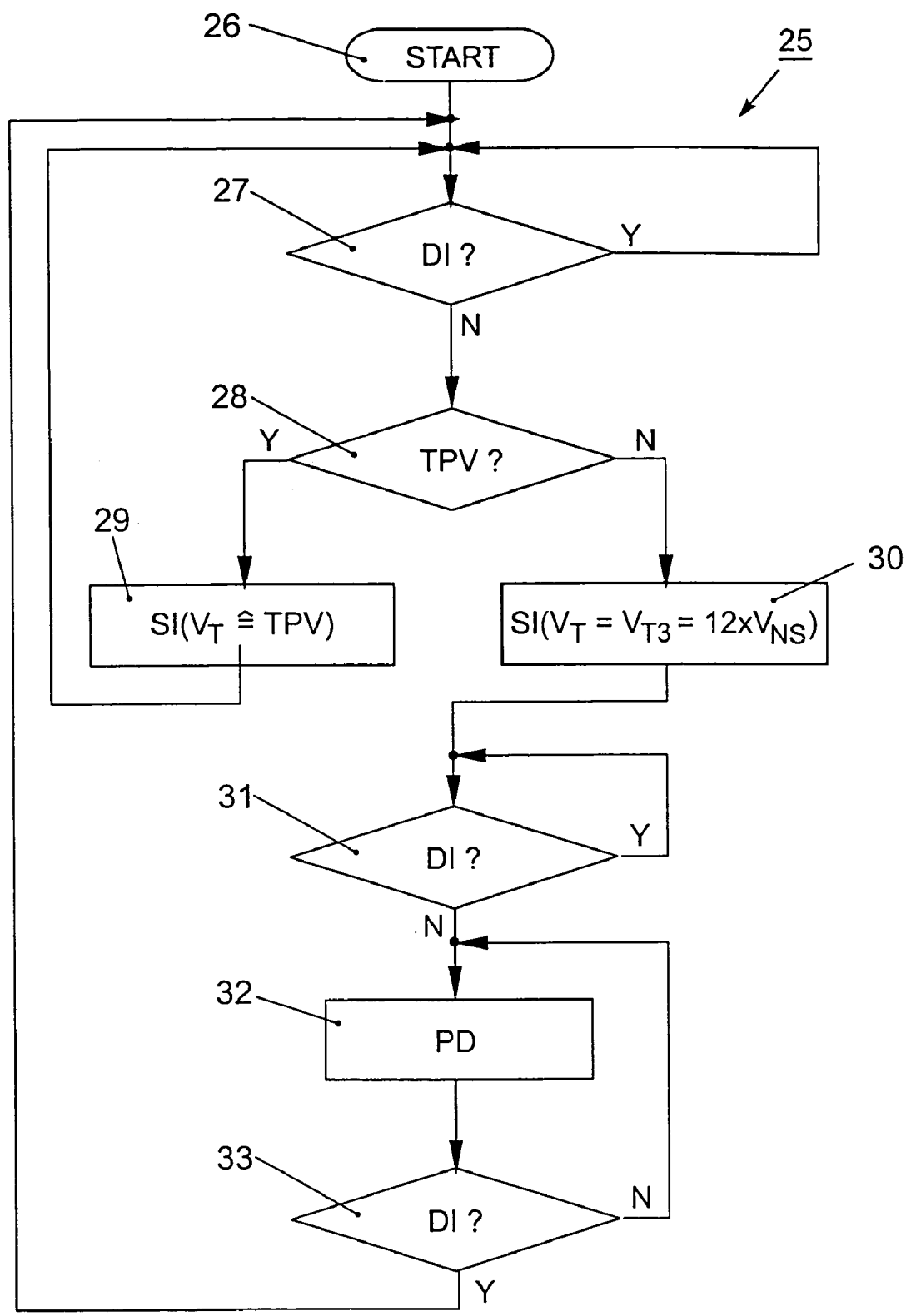
FIG. 3 is a flow chart which represents a method of reproducing reproduction data and which is carried out by the video recorder shown in FIG. 1.

FIG. 3 shows a flow chart 25 of a program flow for a method of reproducing reproduction data WD, illustrating particularly the process steps of a test to be carried out by the test means 23. The program starts in a block 26 at the instant $t_1$ when the user actuates a key of the keypad 6 for the activation of the trick-play reproducing mode of the video recorder 1.

In a block 26 which follows the block 27 the test means 23 check whether the read-out stage 21 supplies detection information DI characteristic of the presence of valid first trick-play reproduction data TPD1 at least once during the test interval of 0.6 seconds. The program remains in the block 27 until no longer any detection information DI is received within a test interval T.

In the example of use the read-out stage 21 no longer supplies any detection information DI to the test stage 21 as from the instant $t_2$ because starting from the magnetic tape position P3 no trick-play reproduction data TPD can be reproduced from the magnetic tape 2 which is moved at the first trick-play speed $V_{T1}$.

As soon as the test means 23 no longer receive any detection information DI it is examined whether a trick-play speed code TPV is reproduced from trick-play packs during the test interval T in a block 28. In the example of use it is assumed that a trick-play speed code TPV reproduced as from the instant $t_2$ characterizes the second trick-play speed $V_{T2}$ and the third trick-play speed $V_{T3}$.

After expiry of the test interval T at the instant $t_3$ the program is continued in a block 29, where the test means 23 supply control information SI ($V_{T2}$) to the control means 8 in order to start a transport of the magnetic tape 2 with the second trick-play speed $V_{T2}$. On the one hand, this is because the test means 23 have made sure, by evaluation of the trick-play speed code TPV, that third trick-play reproduction data TPD3 are reproducible during transport of the magnetic tape 2 with the second trick-play speed $V_{T2}$ and, on the other hand, because the second trick-play speed $V_{T2}$ is more like the first trick-play speed $V_{T1}$ selected by the user than the third trick-play speed $V_{T3}$. Subsequently, the transport means 7 move the magnetic tape 2 with the second trick-play speed $V_{T2}$ from the instant $t_3$, upon which the third trick-play reproduction data TPD3 are reproduced as reproduction data WD.

This yields the advantage that an automatic change-over from the first trick-play speed $V_{T1}$ to the second trick-play speed $V_{T2}$ is achieved in order to enable subsequent reproduction of picture information and sound information by the television set 5. In addition, the evaluation of the trick-play speed code TPV has the advantage of an automatic change-over to the second trick-play speed $V_{T2}$ at which the possibility of reproduction of the trick-play reproduction data TPD3 is assured.

The program in accordance with the flow chart 25 proceeds from the block 29 to the block 27. During the test in the block 27 the test means 23 detect that starting from the instant $t_4$, while the magnetic tape 2 is moved with the second trick-play speed $V_{T2}$, no detection information DI is supplied to the test means 23. Furthermore, the test means 23 detect during the test in the block 28 that starting from the instant $t_4$ no trick-play speed code TPV has been recorded in subcode reproduction areas of the magnetic tape 2, for which reason the program proceeds to a block 30.

In the block 30 the test means 23 supply control information SI($V_{T3}$) characteristic of the third trick-play speed $V_{T3}$ to the control means 8 in order to cause a transport of the magnetic tape 2 with the third trick-play speed $V_{T3}$. Subsequently, from the instant $t_5$ fifth trick-play reproduction data TPD5 is reproduced as reproduction data WD.

This yields the advantage that immediately after the instant $t_4$, from which instant third trick-play reproduction data TPD3 were no longer reproducible during transport of the magnetic tape 2 with the second trick-play speed $V_{T2}$, an automatic change-over to the third trick-play speed $V_{T3}$ is effected at which it is assured that trick-play reproduction data TPD are reproducible, if any trick-play reproduction data TPD have been recorded for the third film.

The program in accordance with the flow chart 25 proceeds from the block 30 to a block 31. In the block 30 the test means 23 check, as in the block 27, whether detection information DI has been received at least once during the test interval T. The test means 23 then detect that from the instant $t_6$ till the instant $t_7$ during the test interval T no detection information DI is received, for which reason the program proceeds to a block 32.

In the block 32 the test means 23 supply the image data activation information BAI to the OSD memory stage 24 in order to supply OSD image data PD stored in the OSD memory stage 24 to the output terminal 3. Furthermore, index data ID reproduced from subcode reproduction areas by the read-out stage 21 are supplied from the read-out stage 21 to the OSD memory stage 24 via the test means 23, which stage inserts the information about the fourth film, which is contained in the index data, as text into the OSD image data PD. The title of the fourth film, actors in the fourth film and further information about the fourth film are thus inserted into the OSD image data PD. In addition, the current magnetic tape position P is inserted as text into OSD image data PD.

This has the advantage that, although no trick-play reproduction data TPD for the fourth film has been recorded on the magnetic tape 2, an automatic change-over to a display of information about the fourth film is achieved.

The program in accordance with the flow chart 25 proceeds from the block 32 to a block 33. In the block 33 the test means 23 check, as in the block 27 and in the block 31, whether detection information DI is received at least once during the test interval T. The test means 23 then detect that, starting from the instant $t_8$, detection information DI is received during the test interval T, as a result of which from the instant $t_9$ trick-play reproduction data TPD7 is reproduced as reproduction data WD and the program proceeds to the block 27.

This has the advantage that as soon as the magnetic tape position P6 is reached, from which again trick-play reproduction data TPD7 has been recorded on the magnetic tape 2, an MPEG transport stream MP corresponding to the trick-play reproduction data TPD7 is supplied to the output terminal 3.

It is to be noted that after the block 33 it is also possible to carry out a test corresponding to that in the block 28 in order to change over to the user-selected first trick-play speed $V_{T1}$ for the reproduction of the sixth trick-play reproduction data TPD6 starting at the instant $t_9$.

The execution of the program in accordance with the flow chart 25 is terminated at the instant $t_{10}$ at which the user stops the trick-play reproducing mode by the actuation of a key of the keypad 6.

It is to be noted that reproducing means for the reproduction of reproduction data WD containing trick-play reproduction data TPD may likewise be adapted to reproduce reproduction data WD recorded on a hard disc, a CD-ROM, a DVD or similar recording media.

It is to be noted that reproducing means for the reproduction of reproduction data WD containing trick-play reproduction data TPD may likewise be adapted to reproduce reproduction data WD recorded in accordance with another standard than the DVHS standard and to supply processed reproduction data WD in accordance with another standard than the MPEG standard.

It is to be noted that the automatic change-over between trick-play speeds $V_T$ is effected in only one transport direction R but that a multitude of strategies may be adapted for the change-over of the trick-play speeds $V_T$.

It is to be noted that in the trick-play reproducing mode of the video recorder 1 and in the case of a transport of the magnetic tape 2 in the reverse transport direction R2 in a block corresponding to the block 30 a change-over is effected to a trick-play speed $V_T$ corresponding to minus 12 times the normal-play speed $V_{NS}$ of the standard mode. This is because the DVHS standard further specifies that if any trick-play reproduction data TPD is recorded while the magnetic tape 2 is moved in the reverse transport direction R2 trick-play reproduction data TPD should be recorded at least at this trick-play speed $V_T$.

It is to be noted that the test interval T may for example also be 3 seconds or 10 seconds in order to enable the test by the test means 23 to be carried out with greater confidence and reliability.

What is claimed is:

1. A reproducing device for the reproduction of reproduction data recorded on a magnetic tape, comprising:
    a transporter that is configured to transport the magnetic tape with a normal-play speed, a first trick-play speed, and at least a second trick-play speed, the normal-play speed corresponding to a recording speed during the recording of the reproduction data on the magnetic tape,
    a reproducer that is configured to reproduce normal-play reproduction data recorded on the magnetic tape during transport of the magnetic tape with the normal-play speed, first trick-play reproduction data recorded during transport of the magnetic tape with the first trick-play speed, and second trick-play reproduction data recorded during transport of the magnetic tape with the second trick-play speed, and
    a tester that is configured to determine whether, during transport of the magnetic tape with the first trick-play speed, valid first trick-play reproduction data is reproduced, and to supply control information to the transporter in the absence of reproduced valid first trick-play reproduction data during a test interval, in order to cause a transport of the magnetic tape with the second trick-play speed.

2. A reproducing device as claimed in claim 1, wherein the reproducer is configured to reproduce reproduction data recorded on the magnetic tape in accordance with the DVHS standard.

3. A reproducing device as claimed in claim 2, wherein the second trick-play speed corresponds to twelve times the normal-play speed of the standard mode.

4. A reproducing device as claimed in claim 2, wherein the normal-play speed corresponds to at least one of: the speed of 16.67 +/−0.5% mm/s, the speed of 8.33 +/−0.5% mm/s, the speed of 5.55 +/−0.5% mm/s, the speed of 3.33 +/−0.5% mm/s, the speed of 2.38 +/−0.5% mm/s, and the speed of 33.35 +/−5% mm/s.

5. A reproducing device as claimed in claim 2, wherein the tester is configured to check a trick-play speed code, which is characteristic of trick-play speeds, of a trick-play pack which may be contained in the reproduction data, valid trick-play reproduction data being reproducible from the magnetic tape during transport of the magnetic tape with trick-play speeds characterized by said code, and the control information which can be supplied by the tester characterizes a trick-play speed characterized by the trick-play speed code as the second trick-play speed.

6. A method of reproducing reproduction data recorded on a magnetic tape, including:

moving the magnetic tape with a normal-play speed, a first trick-play speed, and a second trick-play speed, the normal-play speed corresponding to a recording speed during the recording of the reproduction data on the magnetic tape, reproducing normal-play reproduction data recorded on the magnetic tape during transport of the magnetic tape with the normal-play speed, reproducing, during transport of the magnetic tape with the first trick-play speed, first trick-play reproduction data recorded on the magnetic tape, and reproducing, during transport of the magnetic tape with the second trick-play speed, second trick-play reproduction data recorded on the magnetic tape, and testing whether, during transport of the magnetic tape with the first trick-play speed, valid first trick-play reproduction data is reproduced, and in the absence of reproduced valid first trick-play reproduction data during a test interval, automatically moving the magnetic tape with the second trick-play speed.

7. A method as claimed in claim 6, wherein the testing determines whether a trick-play speed code, which is characteristic of trick-play speeds, is contained in a trick-play pack in the reproduction data, valid trick-play reproduction data being reproducible from the magnetic tape during transport of the magnetic tape with trick-play speeds characterized by said code, and in the absence of reproduced valid first trick-play reproduction data during a test interval the magnetic tape is subsequently moved with a trick-play speed characterized by the trick-play speed code as the second trick-play speed.

8. A method as claimed in claim 6, wherein, in the absence of reproduced valid second trick-play reproduction data during a test interval, stored OSD image data is supplied, which data may include index data contained in reproduction data reproduced from subcode reproduction areas.

* * * * *